(12) United States Patent
Van Dijk et al.

(10) Patent No.: US 11,052,697 B2
(45) Date of Patent: Jul. 6, 2021

(54) SECURITY DOCUMENT WITH A 3D COLOUR PHOTOGRAPH

(71) Applicant: MORPHO B.V., Haarlem (NL)

(72) Inventors: Erik Van Dijk, Haarlem (NL); Ronald Rene Ten Velden, Overveen (NL)

(73) Assignee: MORPHO B.V., Haarlem (NL)

( * ) Notice: Subject to any disclaimer, the term of this patent is extended or adjusted under 35 U.S.C. 154(b) by 0 days.

(21) Appl. No.: 16/491,607

(22) PCT Filed: Mar. 6, 2018

(86) PCT No.: PCT/NL2018/050138
§ 371 (c)(1),
(2) Date: Sep. 6, 2019

(87) PCT Pub. No.: WO2018/164574
PCT Pub. Date: Sep. 13, 2018

(65) Prior Publication Data
US 2020/0307299 A1    Oct. 1, 2020

(30) Foreign Application Priority Data
Mar. 6, 2017 (NL) .................................... 2018474

(51) Int. Cl.
*B42D 25/41* (2014.01)
*B42D 25/23* (2014.01)
(Continued)

(52) U.S. Cl.
CPC ............. *B42D 25/41* (2014.10); *B42D 25/23* (2014.10); *B42D 25/351* (2014.10); *G02B 3/005* (2013.01); *G02B 3/06* (2013.01)

(58) Field of Classification Search
CPC ...... B42D 25/41; B42D 25/351; B42D 25/23; G02B 3/06; G02B 3/005
(Continued)

(56) References Cited

U.S. PATENT DOCUMENTS 4,765,656 A    8/1988 Becker et al.
9,944,109 B2   4/2018 Nijssen et al.
(Continued)

FOREIGN PATENT DOCUMENTS

EP    0219012 A2    4/1987
EP    1874557 A2    1/2008
(Continued)

OTHER PUBLICATIONS

International Search Report and Written Opinion, dated May 17, 2018, from corresponding PCT application No. PCT/NL2018/050138.

*Primary Examiner* — Justin V Lewis
(74) *Attorney, Agent, or Firm* — Nixon & Vanderhye

(57) ABSTRACT

Identification structure (1) with a portrait image (3) of a holder, the identification structure having a substrate (8,50), a laser sensitive layer (11,55) and a lens array (12,56) overlying the laser sensitive layer (11,55), the substrate including a printed pattern (9,54), the laser sensitive layer including a laser engraved image pattern (15,15'; 16,16'). The laser engraved image pattern forms a three dimensional portrait image (A,B) of the holder and the printed pattern forms a two-dimensional color pattern (C) of the portrait image of the holder, wherein the two-dimensional color pattern (C) and the three-dimensional portrait image (A,B) are adapted to be observed in a superimposed manner.

16 Claims, 7 Drawing Sheets

(51) Int. Cl.
*B42D 25/351* (2014.01)
*G02B 3/00* (2006.01)
*G02B 3/06* (2006.01)

(58) Field of Classification Search
USPC ........ 283/67, 70, 72, 74, 75, 77, 86, 94, 98,
283/109, 110, 112, 901
See application file for complete search history.

(56) References Cited

U.S. PATENT DOCUMENTS

| | | |
|---|---|---|
| 10,029,507 B2 | 7/2018 | Van Den Berg |
| 2008/0160226 A1 | 7/2008 | Kaule et al. |
| 2013/0021339 A1 | 1/2013 | Van Den Berg et al. |
| 2018/0333977 A1* | 11/2018 | Van Den Berg ...... G03F 7/0002 |

FOREIGN PATENT DOCUMENTS

| | | | |
|---|---|---|---|
| WO | 2006/110038 A2 | 10/2006 | |
| WO | 2011/122943 A1 | 10/2011 | |
| WO | 2015/030575 A1 | 3/2015 | |
| WO | 2016/153345 A1 | 9/2016 | |
| WO | WO-2016153345 A1 * | 9/2016 | ............. B42D 25/41 |

\* cited by examiner

SECURITY DOCUMENT WITH A 3D COLOUR PHOTOGRAPH

FIELD OF THE INVENTION

The invention relates to an identification structure with a portrait image of a holder, the identification structure having a substrate, a laser sensitive layer and a lens array overlying the laser sensitive layer. The substrate comprises a printed pattern, the laser sensitive layer comprising a laser engraved image pattern. The invention also relates to a method of manufacturing such an identification structure.

BACKGROUND OF THE INVENTION

Such an identification structure, such as an identity card, bank card or credit card, is known from EP 219 012 describing in FIG. 7 a combined laser-engraved image and a printed image, both images being formed by sets of interlaced lines situated below elongate cylindrical lenses of an overlying lenticular array. The interlaced lines below the lenses form so-called "tilt" images that change appearance upon changing of the viewing orientation of the card like substrate. The lines are formed by focussing a laser through the lenses, which causes blackening of the underlying plastics material. An invariant printed pattern of coloured tilt images is also present below the cylindrical lenses, the printed pattern presenting a logo, a date etc. that is identical for all identification structures, while the individual and card-specific data are applied by laser engraving.

From WO 2015/030575, an identification assembly, such as a passport, is known having a holder page that is hingedly connected to a neighbouring page. The holder page has a window of transparent plastics material onto which an image is formed by laser engraving in such a way that an underlying image is also formed in the adjacent substrate. The underlying image forms an additional security feature that can be independently inspected by lifting of the holder page.

From WO 2016/153345 a security document is known having a printed colour portrait image through which an underlying laser-engraved line image is formed by focussing a laser beam in a laser-sensitive polycarbonate material layer via an overlying lenticular array. In this manner, the colour pattern is combined with the underlying blackened image lines that are visible through the coloured pattern. As the coloured pattern is situated outside the focal plane of the lenticular array, the viewing of the colour portrait is not affected by the overlying lens structure. In this way a composite image is observed that is formed of the combination of the laser engraved image and the underlying colour image.

It is an object of the present invention to provide an identification structure and a method of manufacturing such a structure, utilizing a coloured portrait image. It is a further object to provide an identification structure and method of manufacturing, which forms an accurate representation of the holder which can be easily identified by an inspecting person and that is resistant against unauthorized alterations. It is a further object to provide an identification structure that can be manufactured in a reliable and reproducible manner at relatively low costs.

SUMMARY OF THE INVENTION

Hereto the laser engraved image pattern forms a three dimensional portrait image of the holder and the printed pattern forms a two-dimensional colour pattern of the portrait image of the holder, wherein in a single perpendicular viewing, position of the substrate, the two-dimensional colour pattern (C) and the three-dimensional portrait image (A,B) are adapted to be simultaneously observed in a superimposed manner as a three-dimensional colour portrait.

By the combination of laser engraving, of blackened line images and the printed colour image, a composite portrait image is obtained that is viewed in one glance, from a single perpendicular viewing position as a three-dimensional colour portrait. This forms an accurate representation of the holder that can be rapidly and reliably be compared with the holder upon inspection and is resistant against unauthorised alterations.

The two-dimensional colour image can be applied by conventional methods such as ink jet printing. The laser sensitive layer and the lens array may be formed of Polycarbonate or any other suitable transparent plastics material. The lens array may be formed by embossing or by imprinting, and the engraved image may be formed in a laser writer in an accurate and reliable manner at high speeds and relatively limited costs. By combining the two-dimensional colour printing technique with the three dimensional laser engraved image technology, the inventors have provided an accurate three-dimensional identity image of a holder of the identification structure that allows accurate and rapid identification upon inspection and that is cannot easily be altered.

With a "two-dimensional" colour pattern or portrait image as used herein, a pattern or image is intended that is observed by both eyes simultaneously and that appears to be situated in an image plane.

With a "three-dimensional" portrait image as used herein, it is intended a portrait image that creates for the viewer the impression of being situated above or below the image plane, i.e. creating the impression of depth. This can be provided by presenting, for different viewing angles, different portrait images corresponding to a respective angle, to both eyes simultaneously or by providing to each eye a respective portrait image in a stereoscopic way.

The identity structure according to the invention can be a driver's license, a bank card or credit card, an identity card, an official document the form of a booklet such as a passport and the like.

The laser engraved image pattern may be formed of at least two portrait images, at different angles, each image being formed of image lines, wherein the image lines of the at least two portrait images are interlaced and grouped into sets of image lines that are located below respective cylindrical lenses of the lens array such that one laser engraved portrait image is imaged into the right eye of the observer and the other laser engraved portrait image is imaged into the left eye of the observer, the colour pattern corresponding to the colour image of the holder being imaged by the lenses into both eyes of the observer. In this way a coloured stereoscopic portrait image is formed.

Identification structure according to claim 1, 2 or 3, wherein the lens array has a focal distance h, the laser engraved image pattern being situated at or near a focal plane of the lens array, the colour pattern being printed at a distance d from the focal plane wherein d is at least 0.1*h, preferably at least 0.3*h, such as between 3*h and 5*h.

The colour pattern may be formed of pixels having a width that is of about the same size as the width of the lenses. In another embodiment, the colour pixels are larger than the width the cylindrical lenses, such as larger than the width of 2 lenses, such that the colour pixels are not focussed by an individual lens and can be observed by user without being affected by the overlying lenses.

The colour pattern is placed at such a distance from the focal plane of the lenticular array that the viewing of the pattern is not affected by the lenses. In addition, the size of the colour pixels in relation to the dimensions of the lenses may be chosen such that observing of the colour patterns is not or only to a small extent, influenced by the lenses. The laser-engraved image lines are situated at or near the focal plane of the lenses such that these image lines are focussed by the lenses to different eyes of the user to form the three dimensional grey-scale image, that combines in the visual field of the inspecting person with the colour portrait to form a composite 3D colour portrait image. In this way a high-security laser engraved 3D image is combined with a natural looking colour image of the holder.

In an embodiment of an identification structure according to the invention, the laser sensitive layer and the lens structure form an integral laser image layer having at least in the areas of the lenses a transparent window, the laser image layer being hingingly connected to the substrate, the three-dimensional laser engraved portrait being situated in the transparent window, the three-dimensional image and the colour pattern being observable separately h hinging the laser image layer away from the substrate and in combination by hinging the laser image layer against the substrate such that the transparent window and the colour pattern are superimposed.

In this way an identity document is provided that may for instance be a booklet having a holder page that may comprise polycarbonate, PVC, PE, paper and a combination thereof. On the holder page, the three-dimensional portrait image is laser engraved in a transparent window. On an adjacent page that is hingingly connected to the holder page, the two-dimensional colour portrait is provided that can be viewed inspected separately but also trough the transparent window when the holder page is hinged against the adjacent page. In this way an additional security feature is provided by the two-dimensional colour portrait image.

The method of manufacturing an identification structure according to the invention comprises the steps of:
  providing a colour portrait photograph of a holder,
  providing two sets of image lines, each set forming a portrait photograph of the holder at a mutually differing angle
  printing a colour pattern corresponding to the colour portrait on a substrate
  providing a laser image layer comprising the laser sensitive layer and an overlying lens structure
  laser engraving the two sets of image lines into the laser sensitive layer through the lens structure to provide a three-dimensional portrait image.
  combining the substrate with the laser sensitive layer, either prior to or after laser engraving.

In the laser controller, two or more digital portrait photographs, showing the holder at mutually different angles, are scanned along vertical image lines and the intensity of the pixels along the image lines is engraved into the substrate by the laser through the lenses. During laser engraving, blackened lines are formed in the substrate by focusing of the laser energy by the lenses in the focal plane. By laser engraving the image lines into the substrate at a different angle, an interlaced line pattern of the two portrait photographs is formed below the lenses. The resolution of the photographs is independent from the resolution of the lenses.

The colour portrait image may be regular colour passport photograph. This photograph can be in digital form and may form the basis of computer generating the sets of image lines of the portrait holder when viewed at different angles. A method of computer generating rotation images is described in WO 2011/122943.

The colour image is printed on the substrate, which may be of paper, plastics or may be laminate thereof. The printed can then be combined with a preformed laser image layer consisting of a laser sensitive layer on top of which a lenticular array is provided by embossing or imprinting. Next, the laser engraved images are applied by a computer controlled laser engraving device wherein the grey scale values line images control the blackening of the laser sensitive material below the lenses. Alternatively the laser engraving takes place before combining the laser image layer with the colour primed substrate.

An embodiment of a method according to the invention comprises the step of connecting the laser image layer to the substrate in a hinging manner such that the laser engraved image can be superimposed on the colour pattern to be jointly observed by a user, the laser engraved image and the colour pattern being individually observable by hinging the laser image layer away from the substrate. In this method, the colour printing of the substrate and the laser engraving of the laser image layer in a transparent window of the holder page, are distinct processes that may be carried out in respective stations.

BRIEF DESCRIPTION OF THE DRAWINGS

Some embodiments of an identity structure and a method of manufacturing such an identity structure according to the invention will by way of non-limiting example be described in detail with reference to the accompanying drawings. In the drawings.

DETAILED DESCRIPTION OF THE INVENTION

Figure 1:
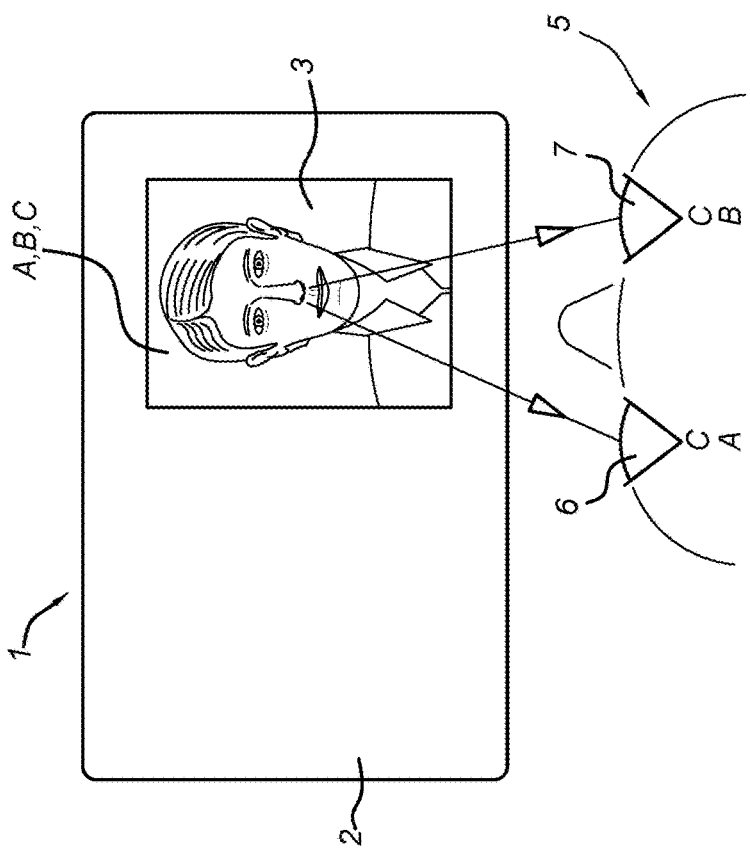
FIG. 1 schematically shows an identity structure according to the invention.

FIG. 1 shows an identity document 1 according to a first embodiment of the invention, with a card body 2 and a portrait image 3 of a holder of the document 1. The portrait image 3 is a composite image that is formed by two or more laser engraved images A, B and one or more colour images C that can be simultaneously viewed by an observer 5. The images A and B represent the portrait of the holder at slightly different angles. The portrait image 3 is placed below a lens structure that images the image A into the observer's left eye 6 and the image B into the right eye 7 at viewing distances of for instance between 30 cm and 70 cm The lens structure does not affect observing the colour portrait image C that can be simultaneously viewed by the observer 5 with both eyes 6, 7

Figure 2:
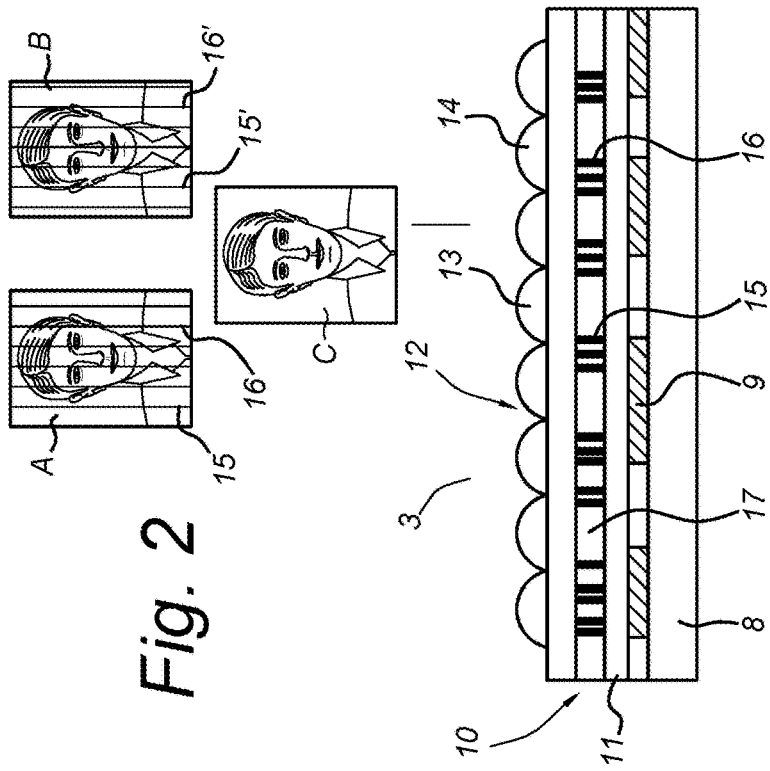
FIG. 2 shows a cross-sectional view of the image area of the identity structure of FIG. 1.

FIG. 2 shows a cross-sectional view of the composite portrait image 3. A substrate 8 carries a printed colour pattern of colour pixels 9. The substrate 8 may be formed of plastics, paper or a laminate of different paper and plastics materials. The colour pixels 9 may be formed onto the substrate by offset printing, ink jet printing or similar printing technologies that are well known in the art.

On top of the substrate 8, a laser image layer 10 is provided that is made up of a laser sensitive layer 11 and an overlying lenticular array 12 of cylindrical lenses 13, 14. The laser sensitive layer 11 and lenticular array 12 may be formed of polycarbonate. Below the lenses 13, 14, sets of image lines 15, 15'; 16, 16' are formed by laser engraving, wherein a laser beam is focussed by the lenses 13, 14 to cause a blackening of the laser sensitive layer 11 to form grey scale image lines. The image lines 15, 15'; 16, 16' are grouped below the lenses 13, 14, and extend in the length direction of the lenses at or near the focal plane 17 in the laser sensitive material.

The colour pixels 9 of the colour image C may be of about the same size as the width of the lenses 13, 14 or may be wider than the width of the lenses. The colour pixels 9 are situated at a distance from the focal plane 17 of the lenses so that the lenses 13, 14 do not interfere with observing of the image C by the observer 5.

Figure 3:
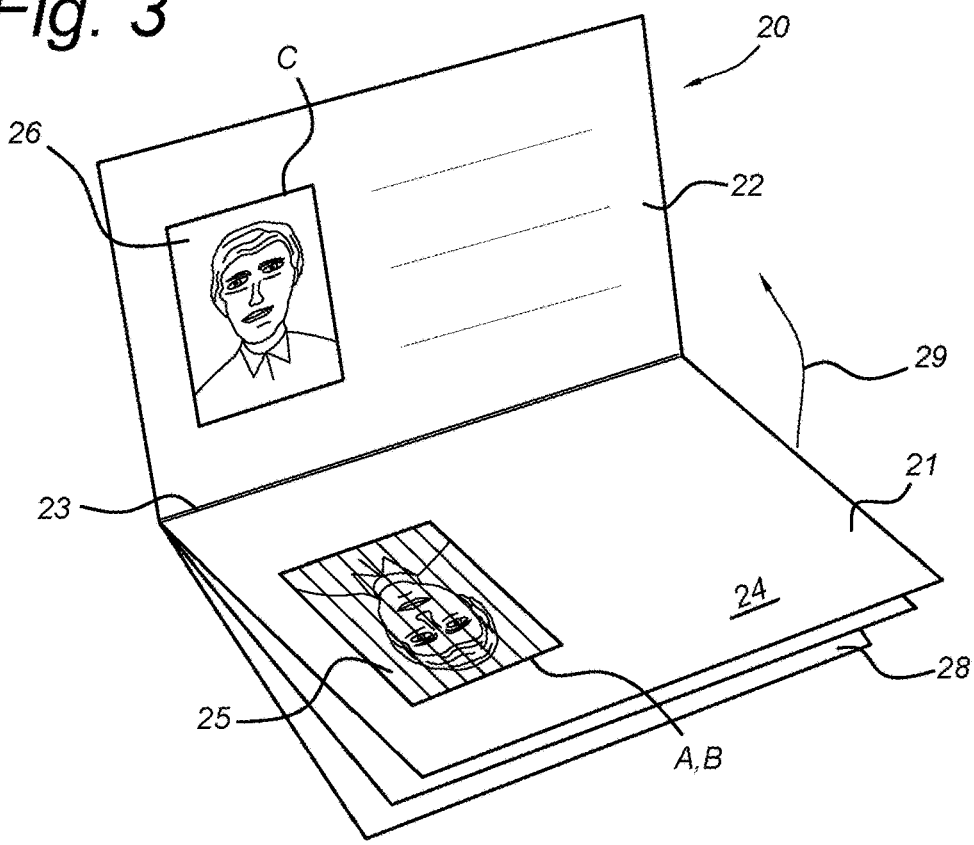
FIG. 3 shows an embodiment of an identity structure according to the invention having two hinging adjacent pages in an opened position.

FIG. 3 shows another embodiment of an identity document 20 according to the invention, such as a passport, in the form of a booklet with a holder page 21 and a neighbouring page 22 that is hingingly connected to the holder page 21 along a hinge line 23. The holder page 21 is relatively stiff and has a card-like shape. It can be formed of plastics, polycarbonate, paper or a laminate thereof and has an opaque area 24 and a transparent window 25. The transparent window 25 can be made of the same material as the laser image layer 10 in FIG. 2 and has two laser engraved images A,B. On the neighbouring page 22, the colour image C is printed, in an image area 26. In FIG. 3 the colour image in image area 26 and the laser engraved images A,B are oriented in landscape position. In the opened position shown in FIG. 3, the portrait in the transparent window 25 is the mirror image of colour image C and the transparent window is viewed on its rear side, on which no lens structure is present.

The two-dimensional colour image C can be viewed by an inspection person, by hinging the holder page 21 into the position as shown in FIG. 3 in a conventional manner.

Figure 4:
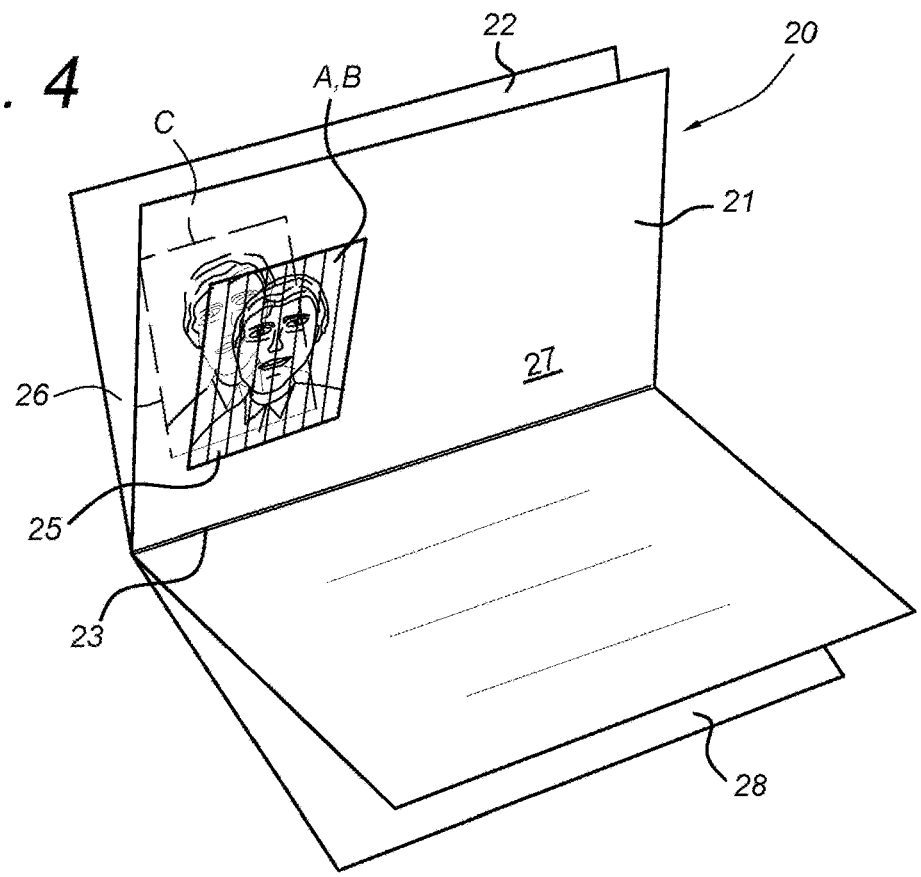
FIG. 4 shows the embodiment of FIG. 3 in a closed position, FIG. 5 schematically shows the formation of two interlaced line images forming a stereoscopic laser engraved image, FIG. 6 schematically shows the combined stereoscopic laser engraved image superimposed on an underlying colour portrait image, forming, a three-dimensional colour image.

Upon hinging the holder page in the direction of the arrow 29 in FIG. 3, the 3D image A,B can be viewed in superposition with the colour image C, as shown in FIG. 4. The image area 26 is located in such a position that upon hinging of the holder page 21 around hinge line 23, the window 25 is superimposed on the image area 26. As can be seen in FIG. 4, the image area 26 and colour image C are visible from the reverse side 27 of the holder page 21 through the transparent window 25. On the side 27 of the holder page 21, the transparent window 25 is provided with a cylindrical lens structure of the type shown in FIG. 2.

By viewing the grey scale laser engraved images A,B superimposed on the colour image C, a three-dimensional colour photograph is presented to the inspecting person. The holder page 21 and the neighbouring page 22 may be combined with multiple pages 28 to form an official document such as a passport.

Figure 5:
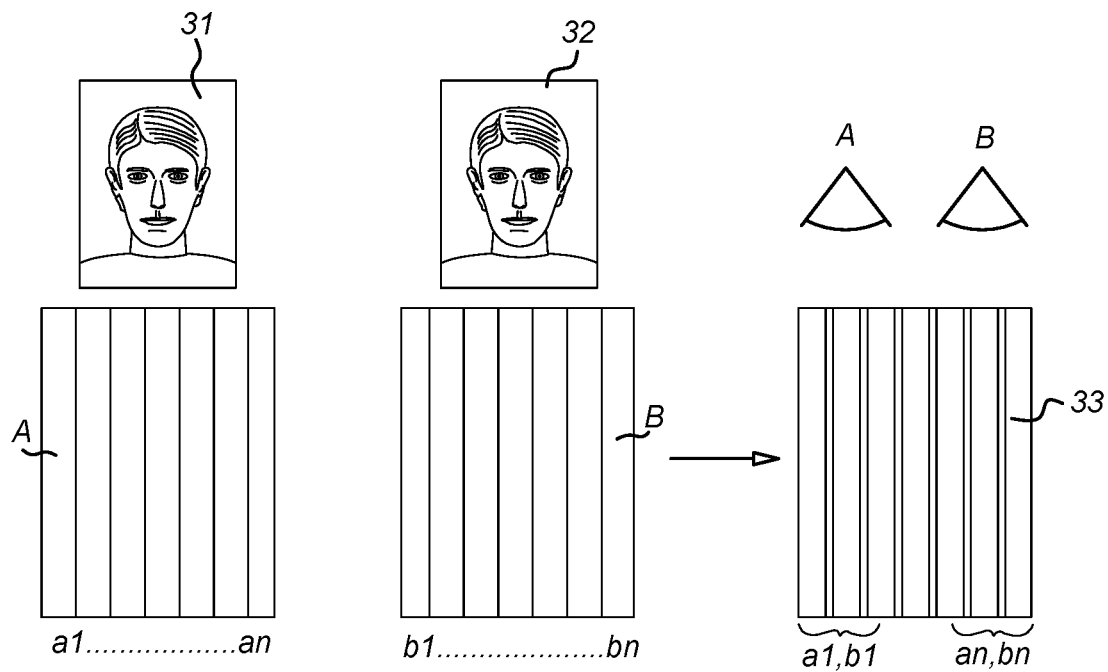

FIG. 5 schematically shows the two portrait images 31, 32 depicting the holder at slightly different angles, for instance at an angular difference of between 5° and 10° for viewing of the laser engraved images A,B at viewing distances of between 30 cm and 70 cm. The portrait images 31, 32 may be made from the holder using a special camera, or may derived from a single photograph of the holder by image processing in a computer, for instance on the basis of the colour portrait image C. The portrait images 31, 32 are imaged in the substrate as sets of image lines a1-an and b1-bn that form the basis for the laser engraved images A,B. The image lines are scanned by a laser beam into the laser sensitive material and are grouped (a1, b1), (a2, b2) . . . (an, bn) below the cylindrical lenses into the laser sensitive layer to form three-dimensional image 33, one eye viewing the image A and the other eye simultaneously viewing image B to obtain a stereoscopic image.

Figure 6:
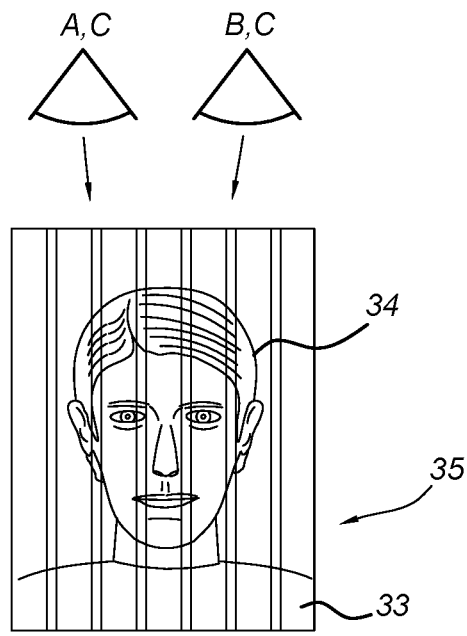

As schematically indicated in FIG. 6, the laser engraved images A,B are superimposed on the colour image 34 so that they are viewed in combination. The images A,B are viewed with respective eyes by an observer to form a stereoscopic or three-dimensional image and the colour image C is viewed in a regular two-dimensional manner with both eyes of an inspecting person.

Figure 7:
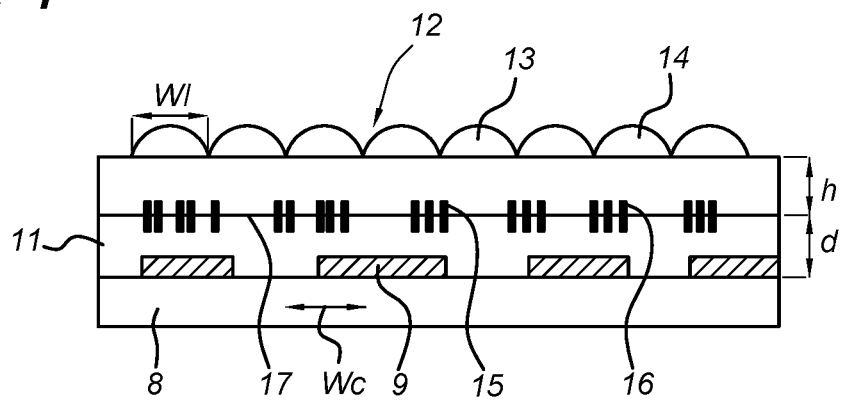
FIG. 7 shows a cross sectional view of a combined engraved laser image layer and a colour printed substrate, FIGS. 8a-8c respectively show the printing stage, the lamination stage and the laser engraving stage of a first embodiment of a method of making an identity structure according to the invention, FIGS. 9a-9c respectively show the printing stage, the laser engraving stage and the combination stage of a second embodiment of a method of making an identity structure according to the invention.

As shown in the schematic cross-sectional view of FIG. 7, the focal length h of the lenses 13, 14 of the lens array 12 may be about 250 μm and the width W1 of the cylindrical lenses may be 80 μm. The width of the laser engraved images lines 15, 16 may be about 15 μm. The distance d of the colour pixels from the focal plane 17 is between about 25 μm and 1.25 mm.

Figure 8A:
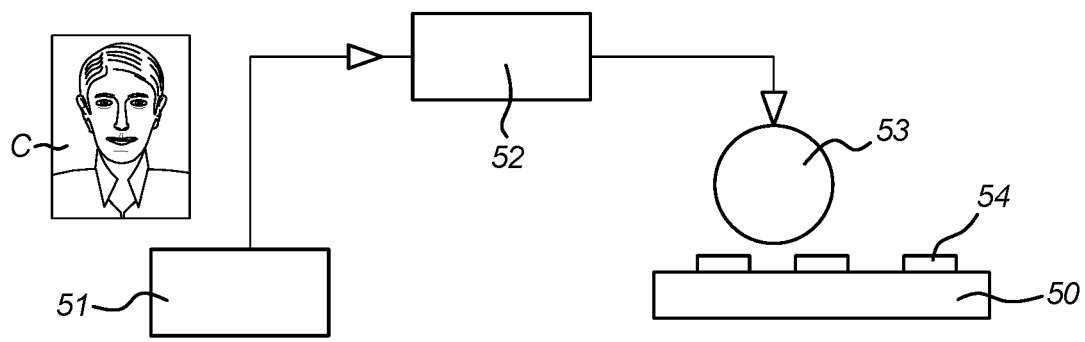

FIG. 8a shows the printing stage of a colour image C onto a substrate 50. The colour image C is stored in digital form in the memory of an image-processing unit 51. The image-processing unit 51 provides the digital image data of the colour image C to print control unit 52 that controls the printing unit 53 applying colour pixels 54 onto the substrate 50.

Figure 8B:
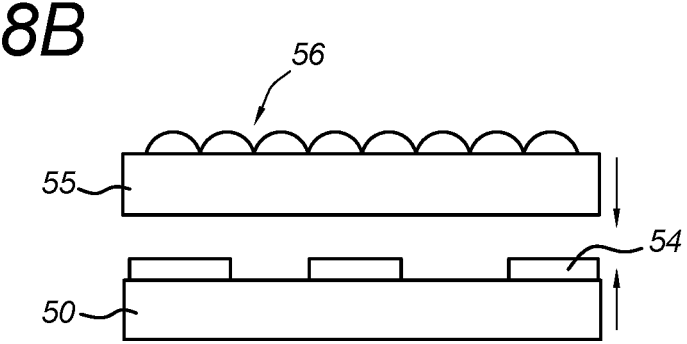

FIG. 8b shows the lamination stage in which the printed substrate 50 is combined with a laser image layer 55 comprising the lenticular array 56 of cylindrical lenses.

Figure 8C:
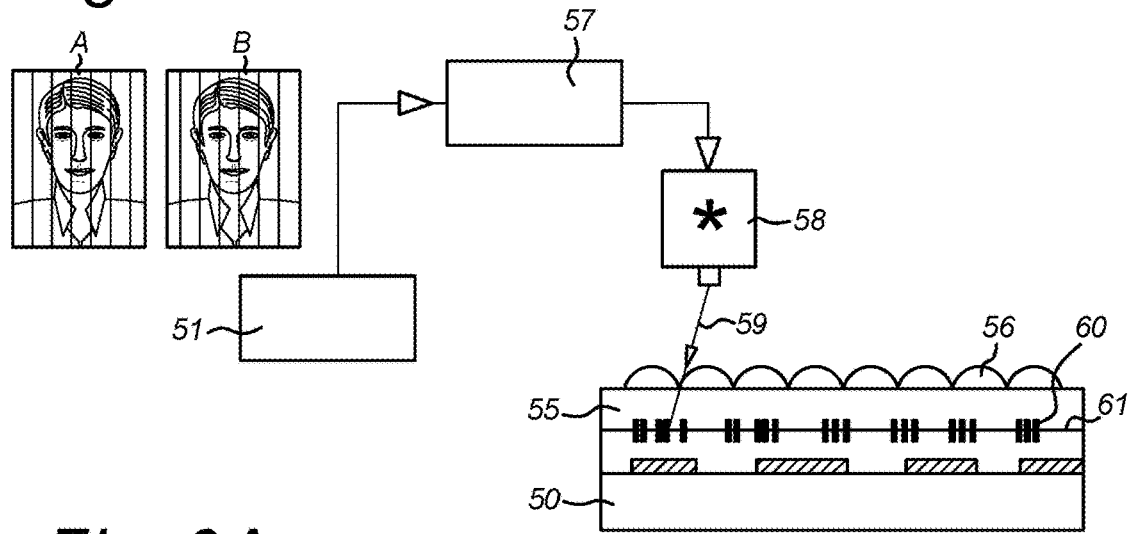

FIG. 8c shows the laser engraving stage in which the image-processing unit 51 provides image data of line images A,B to the laser control unit 57. The laser control unit 57 controls the intensity and the position of laser 58, the laser beam 59 of which is focussed by the lenticular array 56 in the image plane of the laser image layer 55 to form sets of grey scale image lines 60.

Figure 9A:
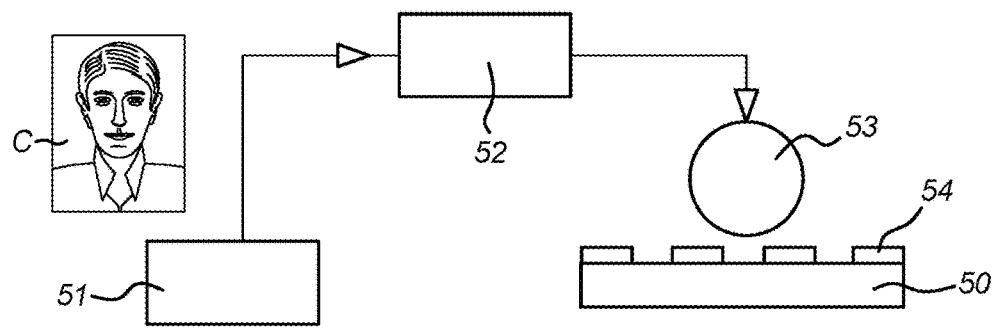
Figure 9B:
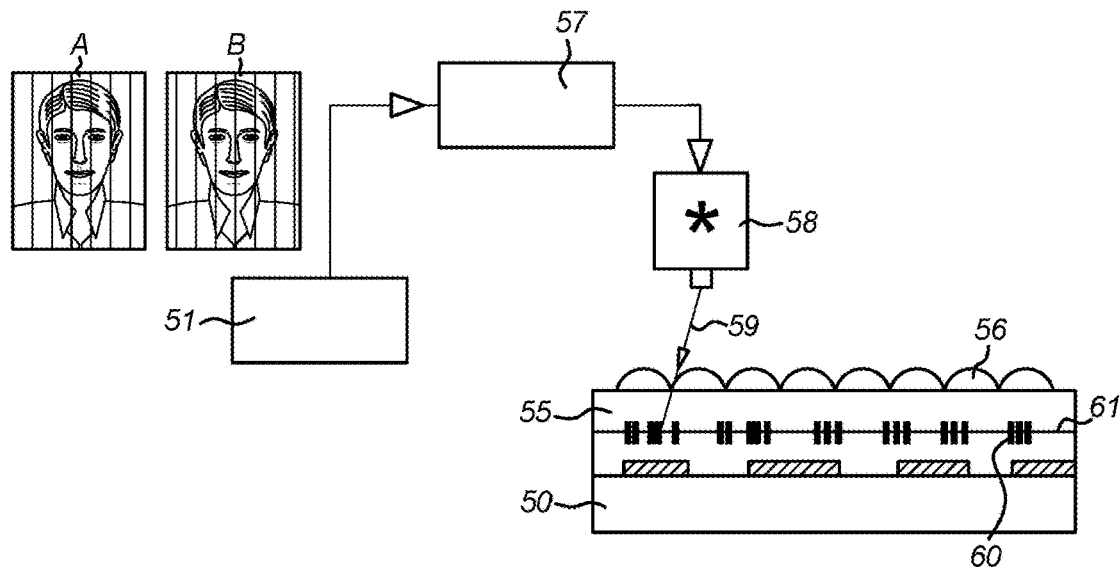
Figure 9C:
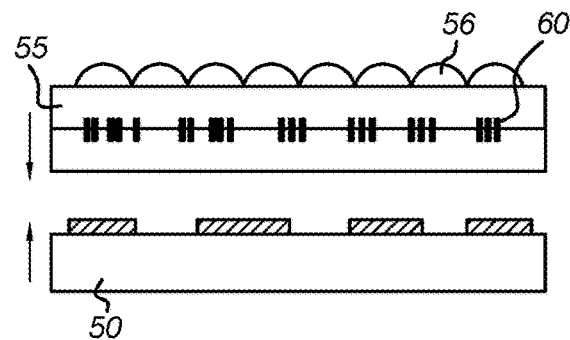

FIG. 9a shows the printing stage that is carried out independently of the laser engraving stage of the laser image layer 55 that is shown in FIG. 9b. The laser engraving stage may be carried out at a different moment and/or at a different location from the printing stage. FIG. 9c shows the combination of the engraved laser image layer 55 and the printed substrate 50. This combination may be in the form of a lamination process or may be in the form of a hinging superposition of the laser image layer 55 and the substrate 50 in the manner described in relation to FIG. 10.

Figure 10A:
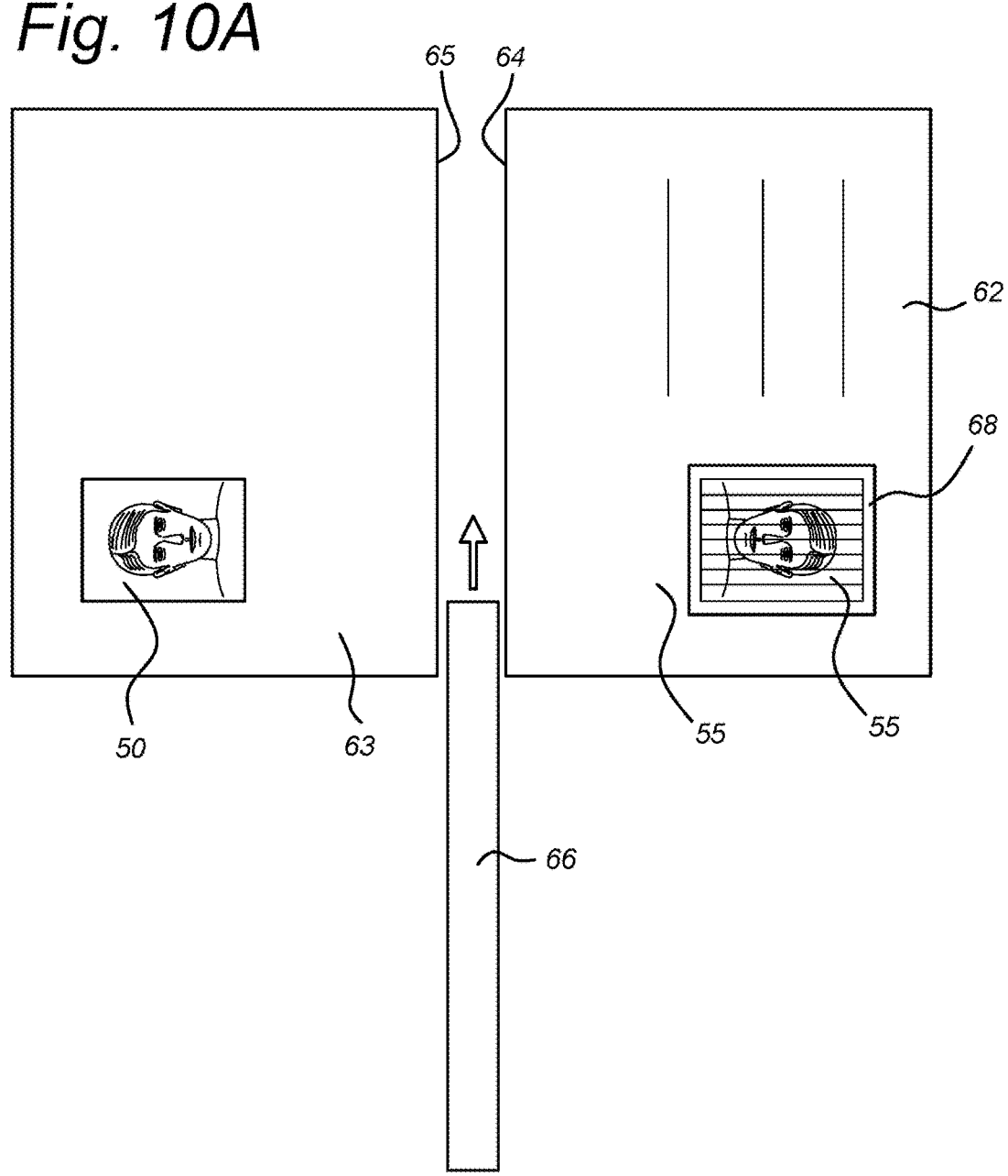
FIGS. 10a-10c show a hingingly interconnected holder page and an adjacent page that are produced according to the method of FIGS. 9a-9c.
Figure 10B:
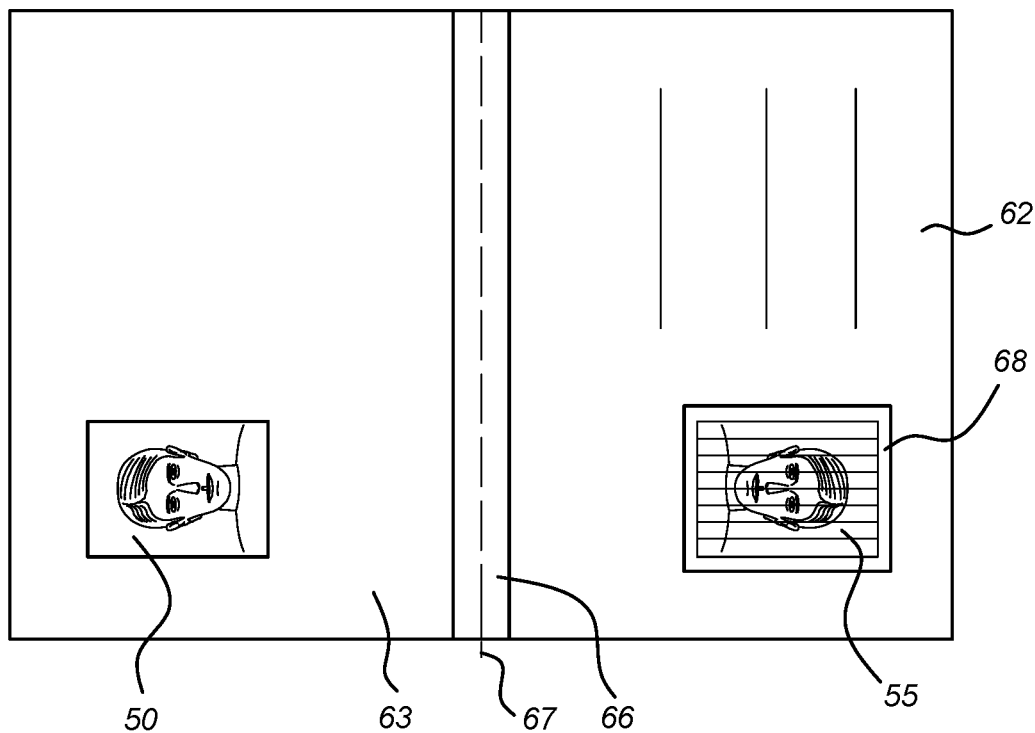
Figure 10C:
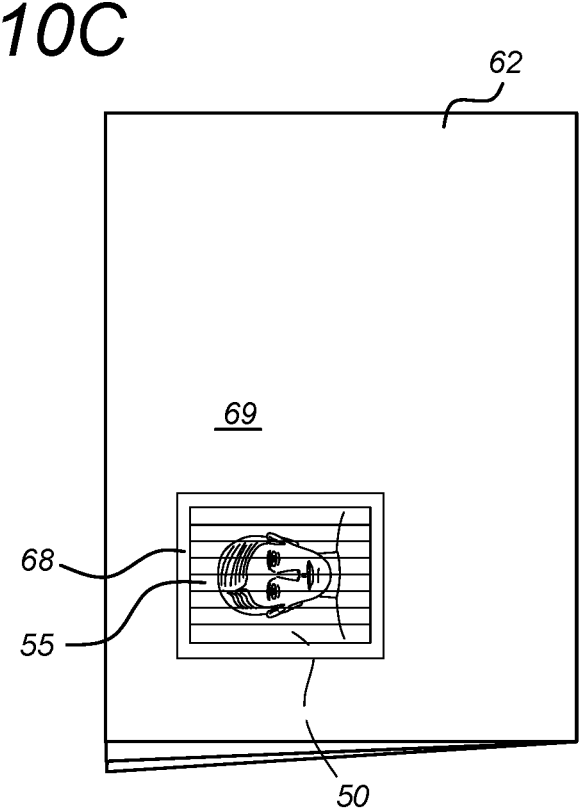

FIG. 10a shows an embodiment wherein the laser engraved image layer 55 is part of a transparent window 68 in a holder page 62. The transparent window 68 may be of similar size as the image layer 55 or may be larger. The printed substrate 50 is formed by a surface area of an adjacent page 63. The pages 62, 63 are placed with their sides 64, 65 in close proximity or in contact and are interconnected via a hinging connecting strip 66, as can be seen in FIG. 10b, to be hingeable along hinge line 67. When the holder page 62 is hinged around the hinge line 67 to overlie the adjacent page 63, as shown in FIG. 10c, the laser engraved image layer 55 can be seen, in combination with the underlying printed substrate 50 through the transparent window 68 from the rear side 69 of the holder page 62.

The invention claimed is:

1. An identification structure with a portrait image of a holder, the identification structure comprising:
   a substrate;
   a laser sensitive layer; and
   a lens array overlying the laser sensitive layer,
   the substrate comprising a printed pattern, and
   the laser sensitive layer comprising a laser engraved image pattern,
   wherein the laser engraved image pattern forms a three dimensional portrait image of the holder, and the printed pattern forms a two-dimensional colour pattern of the portrait image of the holder,
   wherein the two-dimensional colour pattern and the three-dimensional portrait image are adapted so as to be simultaneously observed in a superimposed manner as a three-dimensional colour portrait when the substrate is viewed in a single perpendicular viewing position, and
   wherein the laser engraved image pattern is formed of at least two portrait images, at different angles, each image being formed of image lines, and
   wherein the image lines of the at least two portrait images are interlaced and grouped into sets of image lines that are located below respective cylindrical lenses of the lens array such that one laser engraved portrait image is imaged into a right eye of an observer and the other laser engraved portrait image is imaged into a left eye of the observer, the colour pattern corresponding to the colour image of the holder being imaged by the lenses into both eyes of the observer.

2. The identification structure according to claim 1, wherein the colour pattern is formed of pixels having a width in a direction transversely to a length direction of the cylindrical lenses that is larger than a width of the lenses.

3. The identification structure of claim 2, wherein the colour pattern is formed of pixels having a width in a direction transversely to a length direction of the cylindrical lenses that is larger than the width of two of the lenses.

4. The identification structure according to claim 3, wherein the lens array has a focal distance h, the laser engraved image pattern being situated at a focal plane of the lens array, the colour pattern being printed at a distance d from the focal plane wherein d is at least 0.1*h.

5. The identification structure according to claim 3, wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

6. The identification structure according to claim 2, wherein the lens array has a focal distance h, the laser engraved image pattern being situated at a focal plane of the lens array, the colour pattern being printed at a distance d from the focal plane wherein d is at least 0.1*h.

7. The identification structure according to claim 2, wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

8. The identification structure according to claim 1, wherein the lens array has a focal distance h, the laser engraved image pattern being situated at a focal plane of the lens array, the colour pattern being printed at a distance d from the focal plane wherein d is at least 0.1*h.

9. The identification structure according to claim 8, wherein the lens array has a focal distance h, the laser engraved image pattern being situated at a focal plane of the lens array, the colour pattern being printed at a distance d from the focal plane wherein d is at least 0.3*h.

10. The identification structure according to claim 9, wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

11. The identification structure according to claim 8, wherein the lens array has a focal distance h, the laser engraved image pattern being situated at a focal plane of the lens array, the colour pattern being printed at a distance d from the focal plane wherein d is between 3*h and 5*h.

12. The identification structure according to claim 11, wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

13. The identification structure according to claim 8, wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

14. The identification structure according to claim 1, wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

15. A method of manufacturing an identification structure, comprising the steps of:
providing a colour portrait photograph of a holder;
providing two sets of image lines, each set forming a portrait photograph of the holder at a mutually differing angle;
printing a colour pattern corresponding to the colour portrait on a substrate;
providing a laser image layer comprising the laser sensitive layer and an overlying lens structure;
laser engraving the two sets of image lines into the laser image layer through the lens structure in such a manner that the two-dimensional colour pattern and the three-dimensional portrait image simultaneously observable in a superimposed manner as a three-dimensional colour portrait image when the substrate is viewed in a single perpendicular viewing position;
combining the substrate with the laser image layer, either prior to or after laser engraving; and
connecting the laser image layer to the substrate in a hinging manner such that the laser engraved image can be superimposed on the colour pattern to be jointly observed by a user, the laser engraved image and the colour pattern being individually observable by turning the laser image layer away from the substrate.

16. An identification structure with a portrait image of a holder, the identification structure comprising:
a substrate;
a laser sensitive layer; and
a lens array overlying the laser sensitive layer,
the substrate comprising a printed pattern, and
the laser sensitive layer comprising a laser engraved image pattern,
wherein the laser engraved image pattern forms a three dimensional portrait image of the holder, and the printed pattern forms a two-dimensional colour pattern of the portrait image of the holder,
wherein the two-dimensional colour pattern and the three-dimensional portrait image are adapted so as to be simultaneously observed in a superimposed manner as a three-dimensional colour portrait when the substrate is viewed in a single perpendicular viewing position, and
wherein the laser sensitive layer and the lens array form an integral laser image layer having at least in areas of the lenses a transparent window, the laser image layer being hingingly connected to the substrate, the three-dimensional laser engraved portrait being situated in the transparent window, the three-dimensional image and the colour pattern being observable separately by turning the laser image layer away from the substrate and in combination by turning the laser image layer against the substrate such that the transparent window and the colour pattern are superimposed.

\* \* \* \* \*